United States Patent [19]

Edwards et al.

[11] Patent Number: 5,770,939
[45] Date of Patent: Jun. 23, 1998

[54] PROGRAMMABLE AMPLITUDE RAMP GENERATOR FOR AUTOMOTIVE VOLTAGE REGULATORS

[75] Inventors: Arthur J. Edwards, Hoffman Estates, Ill.; Nicholas Lee, Toulouse, France

[73] Assignee: Motorola Inc., Schaumburg, Ill.

[21] Appl. No.: 655,793

[22] Filed: May 30, 1996

[51] Int. Cl.[6] .................................................. H02D 9/30
[52] U.S. Cl. ............................... 322/28; 363/123; 320/61
[58] Field of Search ............................. 322/22, 23, 24, 322/25, 27, 28; 363/123; 320/61

[56] References Cited

U.S. PATENT DOCUMENTS

| | | | |
|---|---|---|---|
| 4,346,337 | 8/1982 | Watrous | 322/25 |
| 4,388,586 | 6/1983 | Lamoth | 323/283 |
| 4,388,587 | 6/1983 | Lamoth et al. | 323/283 |
| 4,420,717 | 12/1983 | Wallace et al. | 318/696 |
| 4,486,702 | 12/1984 | Edwards | 322/28 |
| 4,700,124 | 10/1987 | Anderson | 323/225 |
| 5,184,290 | 2/1993 | Ozawa et al. | 363/21 |
| 5,233,508 | 8/1993 | Yamamura et al. | 363/49 |

*Primary Examiner*—Steven L. Stephan
*Assistant Examiner*—Nicholas Ponomarenko
*Attorney, Agent, or Firm*—Nicholas C. Hopman

[57] ABSTRACT

A programmable amplitude ramp generator for an automotive voltage regulator includes a selection circuit (405) with an output (406) that provides a selection signal (407) with a plurality of states. A voltage reference circuit (401, 403) includes an output (410) that provides a different reference voltage dependent on each of the plurality of states of the selection signal (407). A resistive device (411) has an input (414) coupled to the output (410) of the voltage reference (401, 403), and an output (416). A gateable multi-resistive device (413) has an output (415) coupled to the output 416 of the resistive device 411. A coupleable resistive device (409) has an input (419) coupled to the output (410) of the voltage reference circuit (401, 403) and an output (421) coupleable to the output (416) of the resistive device (411) responsive to receipt of one of the plurality of states of the selection signal (407). A regulator load driving circuit (113, 109, 107, 105, 124) is coupled to the output () of the voltage reference circuit (401, 403). The described structure provides a multi-range operating capability for the automotive voltage regulator.

5 Claims, 3 Drawing Sheets

*FIG.1* —PRIOR ART—

PROGRAMMABLE AMPLITUDE RAMP GENERATOR FOR AUTOMOTIVE VOLTAGE REGULATORS

FIELD OF THE INVENTION

This invention relates, in general, to voltage regulators for use in an automotive battery charging system, and more particularly, to an improved apparatus for generating a reference ramp for use in such regulators.

BACKGROUND OF THE INVENTION

Modern day automotive battery charging systems use an alternator and an electronic voltage regulator. A charging system needs to supply a relatively constant voltage independent of the load current. This is typically accomplished by switching on and off an alternator's field current under control of a regulator. Additionally, vehicle manufacturers prefer a voltage regulator that will charge a vehicle's battery. A fixed frequency, variable duty cycle voltage regulator having a precision reference voltage source is typically used to satisfy these requirements. A prior art automotive battery charging system is illustrated in FIG. 1.

Referring to FIG. 1, an alternator 101 charges a battery 103 by providing a voltage at terminal 102 as the alternator rotates. Regulation of the alternator's output voltage at both terminal 102, and at another terminal 104 is controlled by regulating conduction of current through a rotor 105 of the alternator 101. Conduction of current through a rotor 105 is controlled via a voltage regulator 100 including a transistor switch 107. The transistor switch 107 is controlled by a drive signal 106 derived from a flip-flop 109. A duty cycle of the drive signal 106 is determined dependent on signals provided from a comparator 113 and a gate 111. The comparator 113 operates dependent on the alternator's output voltage terminal 104, and a variable reference voltage 108 derived from a voltage reference circuit 117 and a binary switching circuit 115. The gate is controlled by the binary switching circuit 115. Now that the regulator's components have been introduced, operation of the voltage regulator 100 will be detailed with the aid of waveforms shown in FIG. 2.

A stairstep, or ramp waveform 201 is a graphical representation of the variable reference voltage 108 provided by the voltage reference circuit 117 and binary switching circuit 115. Essentially, the voltage reference circuit 117 includes a precision voltage reference 119 that drives a weighted resistor network 121 including an input resistor 123. The weighted resistor network 121 is activated via the binary switching circuit 115 at a rate determined by the binary switching circuit's oscillator (OSC). The binary switching circuit is consists of a binary counter driven by the oscillator. As the binary counter is driven by the oscillator, variable reference voltage 108 shown as the ramp waveform 201, is generated at a junction between the input resistor 123 and the weighted resistor network 121. This variable reference voltage 108 drives an input of the comparator 113. Another input of the comparator is driven by the alternator's output voltage provided at the terminal 104.

Immediately after a positive-going edge of the ramp waveform 201, flip-flop 109 is switched on by the drive signal 106 derived from the gate 111, shown in FIG. 2 with waveform 203. The flip-flop 109 causes transistor 107 to be switched on, thereby allowing current to flow through the field coil 105 in an increasing manner as shown by another waveform 205. When the current flowing in the alternator 101 increases causing the output voltage provided at the terminal 104 to increase above the declining variable reference voltage 108, shown with waveform stairstep 201, the comparator 113 provides a signal to switch off the flip-flop 109, thereby turning off transistor 107. This action causes provision of current to the field coil 105 to cease an causes the output voltage provided at the terminal 104 to decrease. This sequence repeats at a period determined by a frequency of the oscillator in the binary switching circuit 115. The positive period of waveform 203, or the amount of time the field coil 105 of the alternator 101 needs to be active, depends on the loading of the voltage regulator 100 by external loads. The higher the load the higher positive period duty-cycle of the waveform 203 needs to be to ensure voltage regulation.

Although this general regulator topology offers many advantages it is not highly integrated. Because there are a relatively large amount of individual components field reliability is somewhat poor. Additionally, this system is relatively complex and costly to manufacture.

Some design prior art design approaches have integrated much of the circuitry of the voltage regulator 100 onto an integrated circuit. In these designs the weighted resistor network 121 (typically binarily weighted), is replaced by a collection of field-effect transistors (FETs), or MOSFETS (Metal Oxide Semiconductor Field-Effect Transistors). These FETs have a geometry that allows the ramp waveform 201 to be created.

FIG. 3 shows a prior art integrated circuit topology for a voltage reference circuit 117'. Essentially, the resistors emulating the input resistor 123 and the weighted resistor network 121 are replaced by FET 301 and 307, 309, 311, 313 respectfully. FETs 303, 305 are used to scale the amplitude of the variable reference voltage 108 to a range useful for the voltage regulator's application. FETs 301, 303, 305 conduct current based on the reference voltage provided by the precision voltage reference 119 and are set into a conductive mode via Vdd 315. The binary weighting of FETs 307, 309, 311, and 313 is designed by selecting drain geometries sized in relation to the desired binary weight. The ramp waveform 201 can be generated by selectively turning on and off the FETs, the amplitude dependent on the FETs 301, 303, 305 functioning essentially as the input resistor 123, the FETs active of FETs 307, 309, 311, and 313, and the precision voltage reference 119.

In this prior art approach the variable reference voltage 108 in-effect determines a gain term in the regulator's control loop. This is because the amplitude of the variable reference voltage 108, and the resulting action of the comparator 113, determines how much alternator output voltage change is necessary for the positive period duty-cycle of the waveform 203 to transition between a relatively low positive period duty-cycle to a relatively high positive period duty-cycle.

While the FETs 307, 309, 311, and 313 are expected to operate like resistive devices over the operating range of the regulator they don't. This is particularly true if Vdd and/or Vref are scaled to different voltages as common in some applications. Scaling, or reducing, either or both Vdd and Vref causes the regulator gain to be a non-linear function related to the FET performance, because the resistivity of the FETs is dependent on an amplitude of the voltage derived from the precision voltage reference 119 and also the amplitude of Vdd 315. For instance, if Vref is changed from say 2.5 volts to 2.0 volts the ramp waveform 201 would reduce in amplitude by 20% if the FETs were purely resistive. However, in practice the ramp waveform 201 is reduced greater than 20% because of a non-linear response to operating at the lower voltage. So, the regulator gain is a non-linear function of Vref. This effect is not only inconvenient but causes poorer noise immunity of the regulator.

What is needed is an improved voltage reference circuit that compensates for variations in Vref and Vdd and has improved noise immunity.

DETAILED DESCRIPTION OF A PREFERRED EMBODIMENT

A programmable amplitude ramp generator for an automotive voltage regulator includes a selection circuit with an output that provides a selection signal with a plurality of states. A voltage reference includes an output that provides a different reference voltage dependent on each of the plurality of states of the selection signal. A resistive device has an input coupled to the output of the voltage reference, and an output. A gateable multi-resistive device has an output coupled to the output of the resistive device. A coupleable resistive device has an input coupled to the output of the voltage reference and an output coupleable to the output of the resistive device responsive to receipt of one of the plurality of states of the selection signal. A regulator load driving circuit is coupled to the output of the voltage reference. The described structure provides a multi-range operating capability for the voltage regulator.

Figure 4:
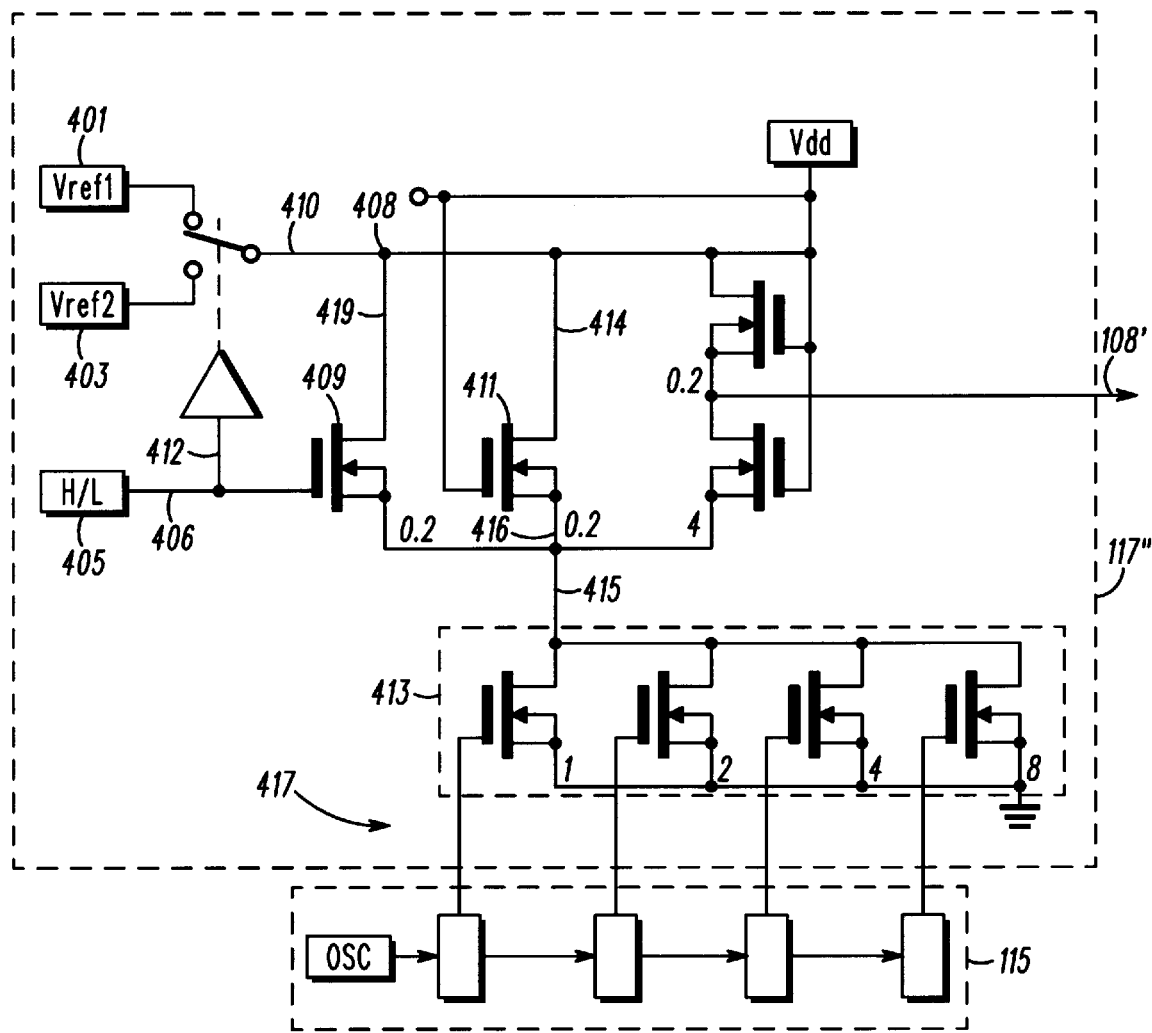
FIG. 4 is a schematic diagram in accordance with a preferred embodiment of the invention.

Preferably, the resistive device, the gateable multi-resistive device, and the coupleable resistive device are all constructed of field-effect transistors (FETs). By using both a change in reference voltage and coupling in the coupleable resistive device, the resultant circuit can provide a ramp voltage in a regulation system that is easily scaleable and linear in any of its ranges. To better understand the above-introduced structure, FIG. 4 will be described next.

An improved voltage reference circuit 117" includes a high-low selection circuit 405 with an output 406 that provides a high-low selection signal 407 with at least a high state and a low state. Other states may be generated depending if other voltage reference ranges are desired. A voltage reference, here shown as two separate references 401 and 403, provides a reference voltage 408 at an output 410 of a first amplitude dependent receipt of a high state of the high-low selection signal 407 at a control input 412, and provides the reference voltage 408 of a second amplitude dependent receipt of the low state of the high-low selection signal 407 at the control input 412. Of course the first amplitude may be either high or lower in magnitude than the second amplitude, and the state of the high-low selection signal 407 could be reversed so that a high state could select the second amplitude if convenient. Preferably, the high state of the high-low selection signal 407 is substantially equal to Vdd so that FETs 409 and 411 have matching on-resistance. If desired FETs 409 and 411 could be of differing sizes.

A resistive device 411, preferably comprised of an FET has an input 414 coupled to the output 410 of the voltage reference 401, 403 and an output 416. A gateable multi-resistive device 413 has a plurality of inputs 417 and an output 415. The output 415 is coupled to the output 416 of the resistive device 411.

A coupleable resistive device 409, preferably constructed of an FET, has an input 419 coupled to the output 410 of the voltage reference circuit and an output 421 coupleable to the output 416 of the resistive device 411 responsive to receipt of the high state of the high-low selection signal 407. In this example the output 421 of the FET 409 is connected to the output 416 of the FET 411, but in-effect the FET 409 isn't electrically part of the circuit until it gets gated-on by the high state of the high-low selection signal 407.

Figure 1:
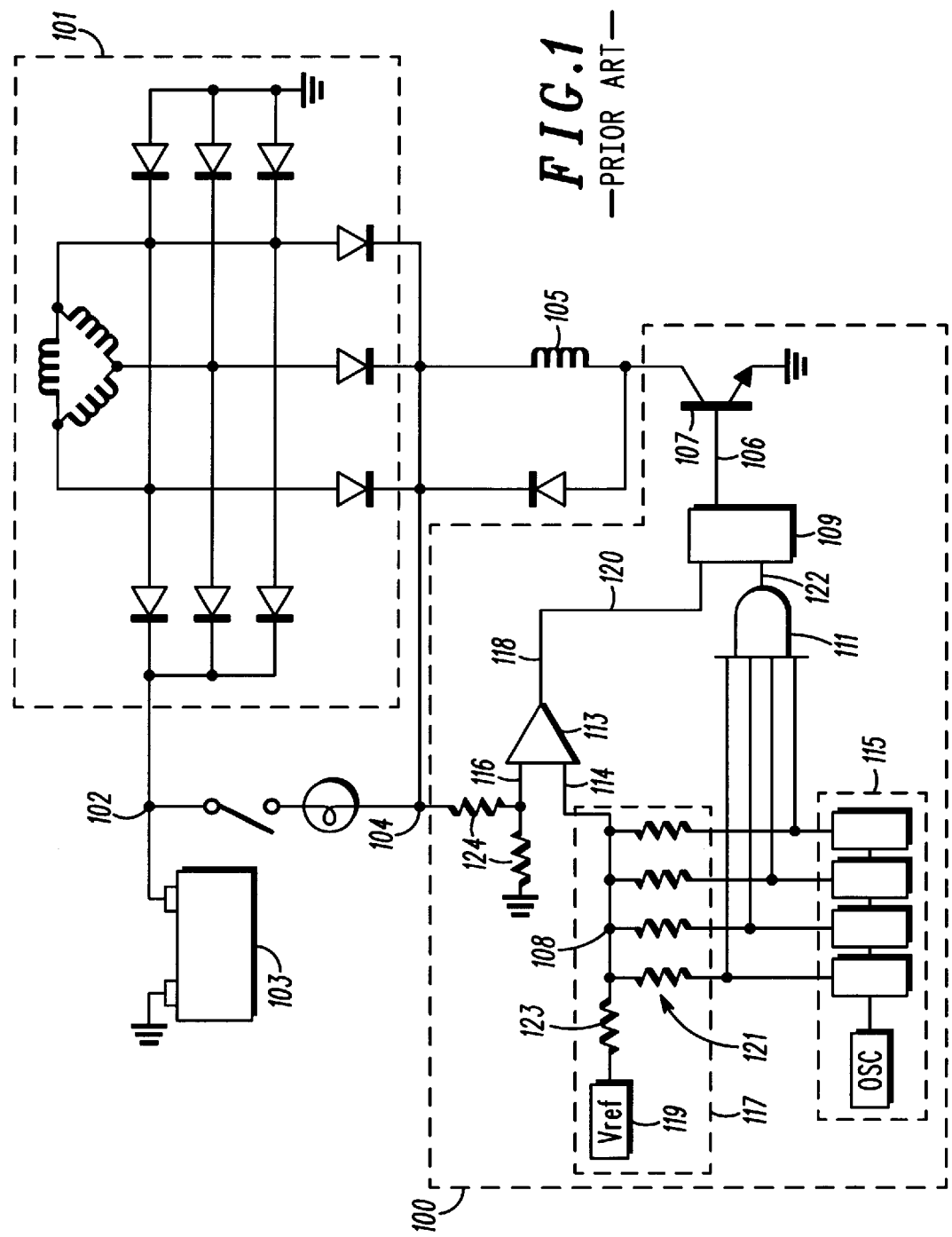
FIG. 1 is a schematic diagram of a prior art automotive battery charging system.
Figure 2:
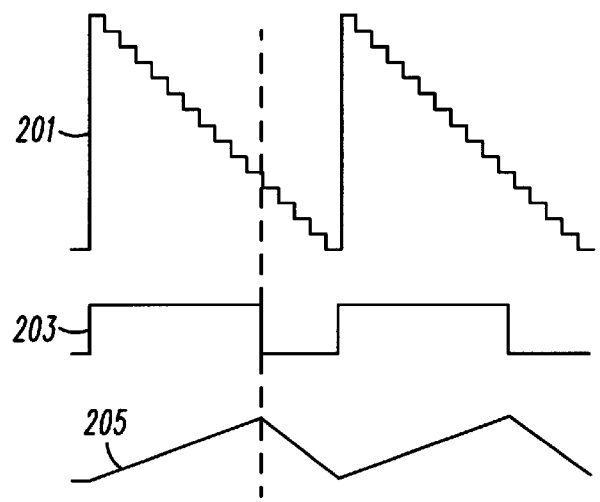
FIG. 2 is a chart of waveforms useful for understanding operation of the prior art system shown in FIG. 1.
Figure 3:
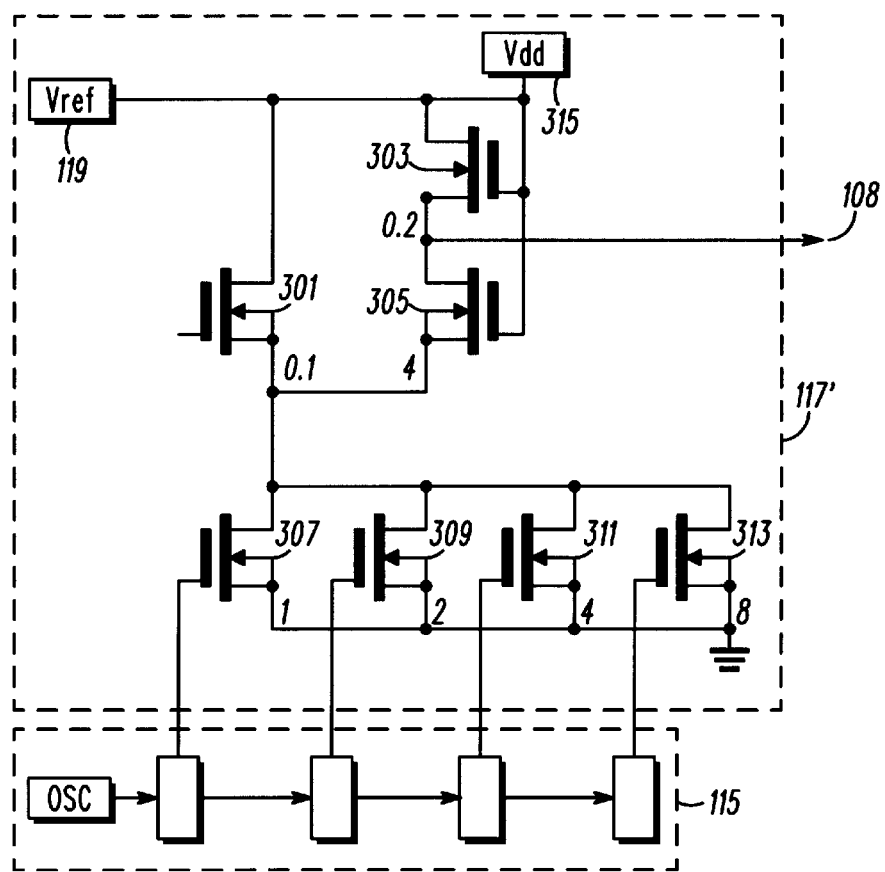
FIG. 3 is a schematic diagram illustrating a prior art integrated circuit topology for a voltage reference circuit and a binary switching circuit.

Referring to both FIG. 1 and FIG. 3, to complete the voltage regulator, an oscillator-counter 115 supplies fixed frequency clock signals to the plurality of inputs 417 of the gateable multi-resistive device 413. This oscillator-counter 115 generates a binary-coded sequence which enables the voltage reference circuit 117" to provide a variable reference voltage 108' in the form of a stairstep or ramp. A logic circuit 111 is coupled to the plurality of inputs 417 of the gateable multi-resistive device 413. This logic circuit 111 is used to control a period of the ramp.

A comparator 113 has a first input 114, a second input 116, and an output 118. The first input 114 receives a combined output 108' from the output of the resistive device 416, the output of the coupleable resistive device 421, and the output of the gateable multi-resistive device 415. A flip-flop 109 has a first input 120 coupled to the output 118 of the comparator 113 and a second input 122 coupled to the output of the logic circuit 111. An output 106 of the flip-flop 109 is connected to a signal switching device 107, preferably a transistor. The signal switching device 107 provides energy to a regulator load 105. The regulator is completed with a sensing circuit 124 coupled between the regulator load 105 and the second input 116 of the comparator 113.

The improved voltage reference circuit 117" compensates for variations in Vref and Vdd and has improved noise immunity. By including a coupleable resistive device in the voltage reference circuit 117" one can adjust the ramp waveform 201 amplitude by switching the magnitude of its voltage reference source without having linearity problems associated with the prior art FET voltage reference circuit 117'.

Thus when the voltage reference is at its higher level (say Vref1 401 is switched on) both the FET devices, 409 and 411, are turned on to provide the desired ramp/DAC magnitude. When the voltage reference is at its lower level (say Vref2 403 is switched on) only the FET device 409 is switched off, to compensate for the otherwise non-proportional reduction in the size of the ramp/DAC with respect to the voltage reference.

Thus the improved circuit 117" has:

$$\frac{V \cdot \text{Ramp} \cdot \text{Vref1}}{\text{Vref1}} = \frac{V \cdot \text{Ramp} \cdot \text{Vref2}}{\text{Vref2}}$$

instead of:

$$\frac{V \cdot \text{Ramp} \cdot \text{Vref1}}{\text{Vref1}} > \frac{V \cdot \text{Ramp} \cdot \text{Vref2}}{\text{Vref2}}$$

as in the prior art circuit 117'.

By reversing the circuit's 117" configuration it would be possible to have exactly the opposite effect, and so have a disproportionately larger ramp at the higher reference voltage, should this be desirable for any reason. The benefits of this new circuit are that one can now re-adjust the ramp size at the same time as one switches the voltage reference and so keep a constant gain (Vramp/Vref), which is not the case with the prior art circuit 117'.

What is claimed is:

1. A voltage regulator useable in an automotive battery charging system, comprising:

a selection circuit having an output for providing a selection signal having a plurality of states;

a voltage reference with an output that provides a different reference voltage dependent on each of the plurality of states of the selection signal;

a resistive device having an input coupled to the output of the voltage reference, and an output;

a gateable multi-resistive device having an output coupled to the output of the resistive device;

a coupleable resistive device having an input coupled to the output of the voltage reference and an output coupleable to the output of the resistive device responsive to receipt of one of the plurality of states of the selection signal; and a circuit for driving a regulator load coupled to the output of the voltage reference.

2. A voltage regulator in accordance with claim 1 wherein the circuit for driving a regulator load comprises:

an oscillator-counter for supplying fixed frequency clock signals to a plurality of inputs of the gateable multi-resistive device;

a logic circuit coupled to the plurality of inputs of the gateable multi-resistive device;

a comparator having a first input, a second input, and an output, the first input receiving a combined output from the output of the resistive device the output of the coupleable resistive device, and the output of the gateable multi-resistive device;

a flip-flop having a first input coupled to the output of the comparator and a second input coupled to the output of the logic circuit, the flip-flop having an output;

a signal switching device coupled to the output of the flip-flop for providing energy to the regulator load; and a sensing circuit coupled between the regulator load and the second input of the comparator.

3. A voltage regulator useable in an automotive battery charging system, comprising:

a high-low selection circuit having an output for providing a high-low selection signal having a high state and a low state;

a voltage reference, operatively coupled to the high-low selection circuit, the voltage reference having a control input and an output, wherein the output provides a reference voltage of a first amplitude dependent receipt of the high state of the high-low selection signal at the control input and provides the reference voltage of a second amplitude dependent receipt of the low state of the high-low selection signal at the control input;

a resistive device having an input coupled to the output of the voltage reference, and an output;

a gateable multi-resistive device having a plurality of inputs and an output coupled to the output of the resistive device;

a coupleable resistive device having an input coupled to the output of the voltage reference and an output coupleable to the output of the resistive device responsive to receipt of the high state of the high-low selection signal; and a circuit for driving a regulator load dependent on a signal present at the coupling between the output of the resistive device, the output of the gateable multi-resistive device, and the output of the coupleable resistive device.

4. A regulator in accordance with claim 3 wherein the circuit for driving a regulator load comprises:

an oscillator-counter for supplying fixed frequency clock signals to the plurality of inputs of the gateable multi-resistive device;

a logic circuit coupled to the plurality of inputs of the gateable multi-resistive device;

a comparator having a first input, a second input, and an output, the first input receiving a combined output from the output of the resistive device the output of the coupleable resistive device, and the output of the gateable multi-resistive device;

a flip-flop having a first input coupled to the output of the comparator and a second input coupled to the output of the logic circuit, the flip-flop having an output;

a signal switching device coupled to the output of the flip-flop for providing energy to the regulator load; and a sensing circuit coupled between the regulator load and the second input of the comparator.

5. An alternator regulator for use with an alternator system including a source of alternating current, rectifier means coupled to rectify the current, and means for supplying an electromagnetic field for the source, the regulator comprising:

a high-low selection circuit having an output for providing a high-low selection signal having a high state and a low state;

a voltage reference, operatively coupled to the high-low selection circuit, the voltage reference having a control input and an output, wherein the output provides a reference voltage of a first amplitude dependent receipt of the high state of the high-low selection signal at the control input and provides the reference voltage of a second amplitude dependent receipt of the low state of the high-low selection signal at the control input;

a resistive device having an input coupled to the output of the voltage reference, and an output;

a gateable multi-resistive device having a plurality of inputs and an output, wherein the output is coupled to the output of the resistive device;

a coupleable resistive device having an input coupled to the output of the voltage reference and an output coupleable to the output of the resistive device responsive to receipt of the high state of the high-low selection signal;

an oscillator-counter for supplying fixed frequency clock signals to the plurality of inputs of the gateable multi-resistive device;

a logic circuit coupled to the plurality of inputs of the gateable multi-resistive device;

a comparator having a first input, a second input, and an output, the first input receiving a combined output from the output of the resistive device the output of the coupleable resistive device, and the output of the gateable multi-resistive device;

a flip-flop having a first input coupled to the output of the comparator and a second input coupled to the output of the logic circuit, the flip-flop having an output;

a signal switching device coupled to the output of the flip-flop for providing energy to a regulator load; and a sensing circuit coupled between the regulator load and the second input of the comparator.

* * * * *